(No Model.)
E. T. BARTRUFF.
BRIDLE BIT.
No. 501,987. Patented July 25, 1893.
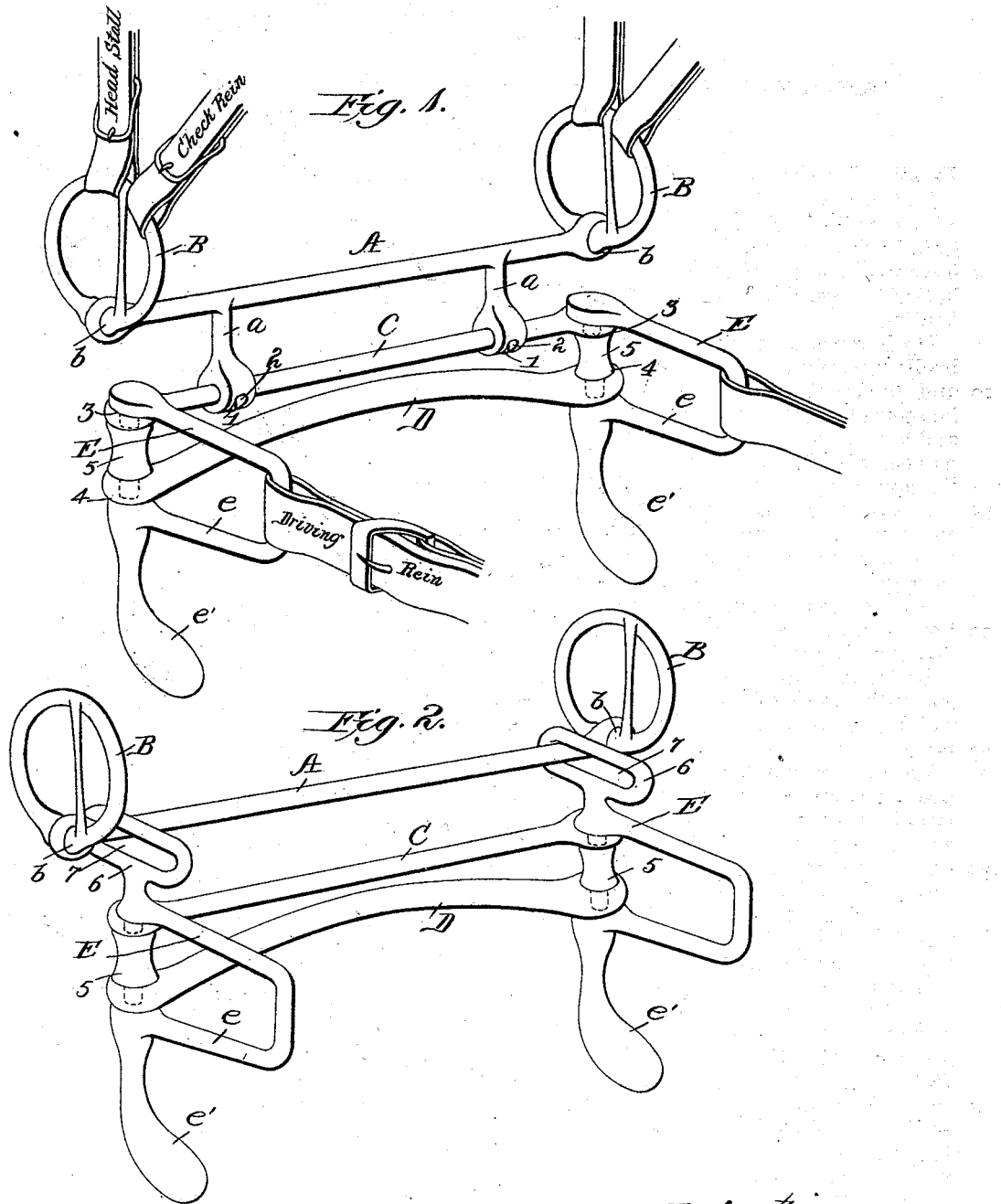

UNITED STATES PATENT OFFICE.

EDWIN T. BARTRUFF, OF KEOKUK, IOWA.

BRIDLE-BIT.

SPECIFICATION forming part of Letters Patent No. 501,937, dated July 25, 1893.

Application filed April 26, 1893. Serial No. 471,868. (No model.)

*To all whom it may concern:*

Be it known that I, EDWIN T. BARTRUFF, a citizen of the United States, residing at Keokuk, in the county of Lee and State of Iowa, have invented new and useful Improvements in Bridle-Bits, of which the following is a specification.

My invention relates to improvements in bridle-bits, of novel and peculiar construction; and its objects are to provide a bit which will be securely held in the mouth of the animal, and is effective in controlling and guiding the movements of the animal, without injury to its mouth or tongue.

I have illustrated my invention, in the accompanying drawings, in which like reference letters and numerals refer to like parts throughout.

Figure 1 is a perspective view of my invention. Fig. 2 is a perspective view of a modified form of my invention.

Letter A represents a bar, provided at each end with eyes $b$, swiveled upon rings B—B, to which the head stall and check-rein are attached.

Letters $a$ represent arms or projections, proceeding from the bar A, having at their terminals, eyes to support the bar C, and which are provided with slots 2, to receive and engage studs or projections 1, which are integral with the bar C.

Letter C represents a second bar, provided with the studs or projections 1, just mentioned, and having eyes at its ends, swiveled upon the cheek-pieces E.

Letter D represents a third bar, curved as shown, provided with eyes at each end, and swiveled upon the cheek-pieces E E. I prefer that the bar D shall be curved as shown in the drawings for the reason, that it is not so liable in that form to injure the animal's tongue. The cheek-pieces E are provided with loops or rings $e$, to which the driving reins may be attached, and are also provided with the extensions $e'$, whose purpose is to prevent the bit from being partially drawn from the animal's mouth, when reining him in one or the other direction.

In Fig. 2, I have shown a modification of my invention, in which I substitute for the arms or projections $a$ $a$ the projection 6, of the cheek-piece E, provided with a slot 7, which carries the bar A A and limits its lateral play, while giving to the lower portions of the bit play in a longitudinal direction. It is necessary, in the construction of a bridle-bit of this character, that there should be a certain distance between the bar A and the bar D, for the reason that the bar A is designed to remain practically stationary, while the draw upon the driving reins, presses the lower bar against the lower jaw of the animal in guiding and controlling his movements; but I have found that where only two bars A and D are employed, and especially where the bar D is straight instead of being curved, the force applied upon the bit by the driving reins, operates to swing the lower bar D in such manner as to force the animal's mouth open, and also to injure the animal's tongue. Not only this, but the animal is continually passing his tongue between the upper bar A and the lower bar D, so that when the driver draws the driving-reins the animal's tongue is pinched and liable to be injured, and the animal caused to become restive and unruly. I have obviated this serious difficulty, by the introduction of two bars C and D, swiveled at their terminals upon the cheek piece E, supporting them by the arms or projections $a$, which engage in bearings in the arm C, and whose lateral movement is prevented, and whose swinging movement is limited by the studs 1 engaging in the slots 2.

Another difficulty, which I have observed in bridle bits of this character, has been, that without some flange or projection, such as $e'$ the bit can not be safely retained in the animal's mouth, when reining him to the right or left. To avoid this, I provide the cheek pieces E with the depending projection $e'$, which renders it practically impossible for the bridle-bit to be displaced.

One of the principal objects of bridle-bits of this form of construction, is to enable the driver by means of the driving-reins, in guiding and controlling the animal, to force the lower bars C and D and particularly D against the lower jaw of the animal, without materially, changing the position of the bar A in the animal's mouth. In accomplishing this result, it will be noticed that in drawing upon the driving-reins, the bars C and D are slightly lifted up, and folded as it were, toward the bar A, so that in a proper construction, the bit is operated without forcing the animal's mouth open, and preventing his closing the same.

Having thus described my invention, what I claim, and desire to secure by Letters Patent of the United States, is as follows:

1. As an article of manufacture the herein described bridle bit, consisting of upper bar A, provided with rings B, the two lower bars C and D; said bar C supported in eyes of arms or projections $a\ a$, proceeding from bar A; cheek-pieces E provided with depending projections $e'$; all substantially as shown.

2. As an article of manufacture, an improved bridle-bit consisting of an upper bar A, provided at its ends, with swiveled rings B, to receive the head-stall and the check-rein, and also provided with the arms or projections $a$, having eyes and the slots 2; the bar C provided at its ends with eyes, and with studs 1, located in the slots 2; the bar D, provided with eyes; and the cheek-pieces E, swiveled to the bars C and D, and provided with depending projections $e'$; all substantially as shown.

3. As an article of manufacture, the bar A provided with eyes and swiveled to the rings B; the bar C provided with eyes, and the bar D provided with eyes; the cheek pieces E swiveled to said bars C and D, provided with the upward projection 6, having the slots 7, and also provided with the depending projections $e'$; all substantially as shown.

EDWIN T. BARTRUFF.

Witnesses:
BENTON J. HALL,
NELLIE M. HARRIS.